March 11, 1930.  C. L. ZABRISKIE  1,750,148
GREASE GUN
Filed Aug. 6, 1925  3 Sheets-Sheet 1
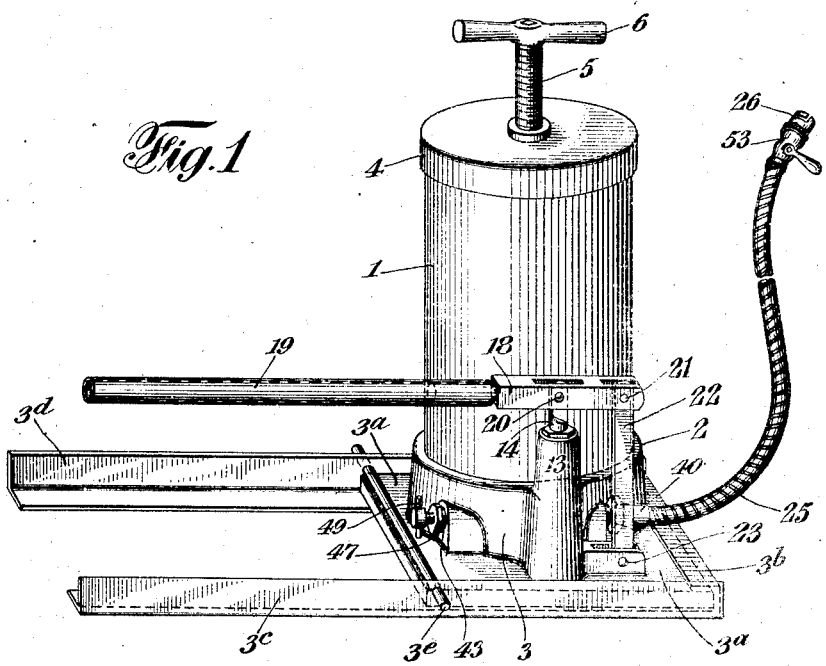
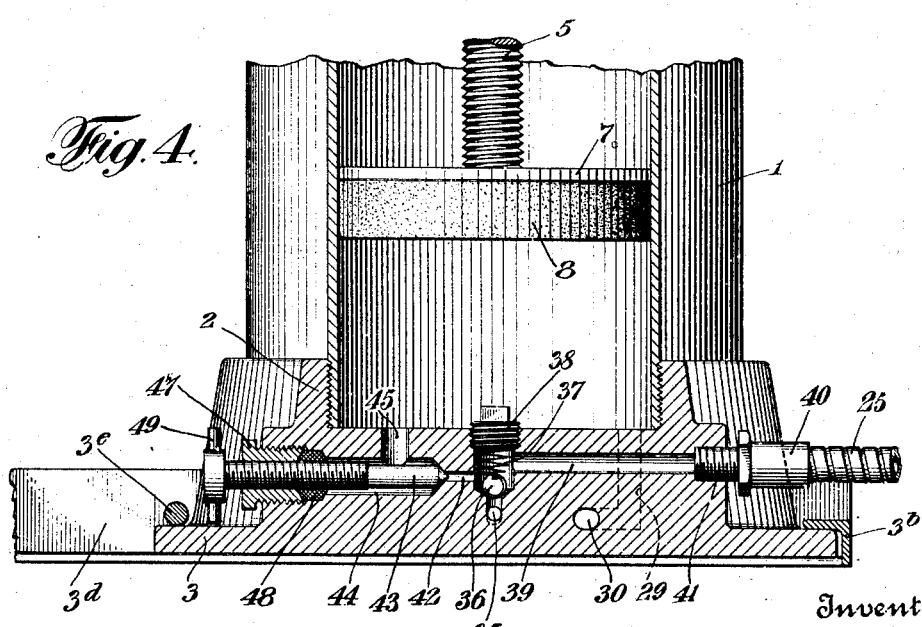
Inventor
Charles L. Zabriskie
By Attorney

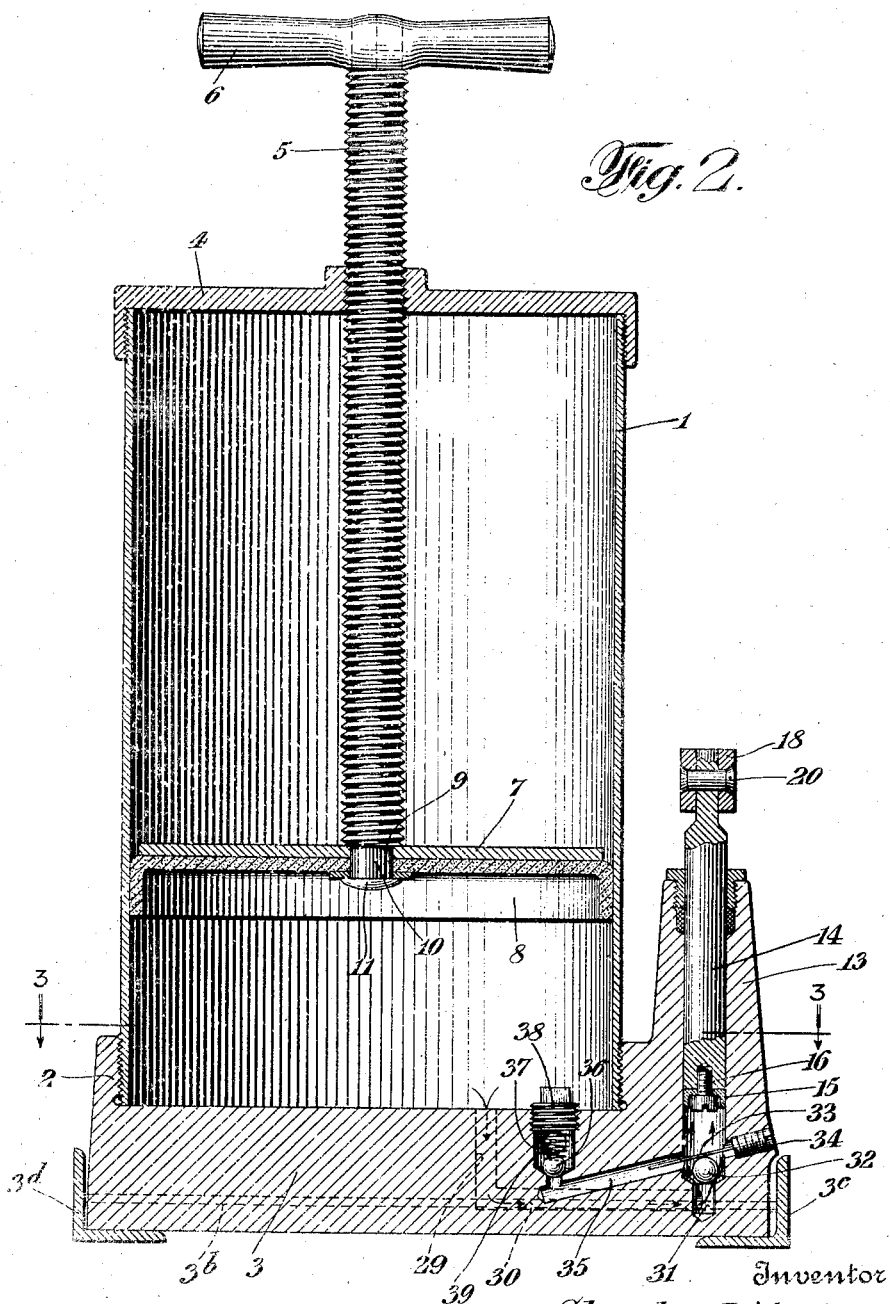

March 11, 1930.  C. L. ZABRISKIE  1,750,148
GREASE GUN
Filed Aug. 6, 1925   3 Sheets-Sheet 3

Inventor
Charles L. Zabriskie
By his Attorney

Patented Mar. 11, 1930

1,750,148

UNITED STATES PATENT OFFICE

CHARLES L. ZABRISKIE, OF NEW YORK, N. Y., ASSIGNOR, BY MESNE ASSIGNMENTS, TO ROGERS PRODUCTS CO., INC., A CORPORATION OF NEW JERSEY

GREASE GUN

Application filed August 6, 1925. Serial No. 48,472.

My present invention relates to the class of lubricant supply devices commonly known as "grease guns", that is to say, the object of the invention is to supply stiff lubricant or grease under very powerful pressure through a detachable coupling of the type now in common use on automobiles under the name of "Alemite", "Dot", etc. In these systems the fittings on the automobile, truck or other machines frequently become clogged so that ordinary screw operated grease guns have not sufficient power to force the grease through to the bearing that is to be lubricated. To meet these conditions, elaborate machines have been designed and are now in use; also there are many schemes for the use of liquid carbon dioxide and other sources of high gaseous pressure.

I have found, however, that the machines devised for this purpose are elaborate and expensive, while the pressures available even from liquid carbon dioxide seldom exceed, say, 2,000 lbs. to the square inch. As contrasted with these, my invention contemplates a simple, hand operated device, costing hardly more than a high grade lifting jack, whereby the grease may be applied at almost any desired pressure up to, say 18,000 lbs. to 20,000 lbs. to the square inch. In my device, this pressure is obtainable by a hand-operated force pump with a plunger of small area. Force pumps have been used for many purposes, but, as applied to my present purpose of pumping grease which is frequently very stiff, particularly in cold weather, such pumps fail on the suction stroke. I have discovered, however, that by combining a hand operated pump with a grease gun source of supply, the hand-operated screw of the latter will be amply sufficient for putting upon the grease a pressure sufficient to make it flow into the pump cylinder on the suction stroke of the pump plunger. An important point about this is my discovery that when properly designed, the hand-operated feed screw does not have to be screwed down at the same time that one lifts the handle to cause the suction stroke of the pump. The grease itself is practically incompressible, but the operation of filling the supply cylinder with the stiff grease and inserting the plunger results in trapping a small quantity of air which is compressed by screwing down the plunger and the elastic expansion of this compressed air is sufficient to force-feed the grease through the pump supply ducts when assisted by the suction stroke of the plunger. The amount of air trapped in the body of the grease may be and preferably is too small to assist feed of grease for as many strokes of the pump as might be desired, but that trapped under the cup leather of the plunger or in any other cavity in communication with grease reservoir will serve the purpose just as well and will have the advantage that the amount of air to be compressed and expanded may be more accurately predetermined.

The above and other features of my invention will be more evident from the following description in connection with the accompanying drawings, in which Fig. 1 is a perspective view of the complete device;

Fig. 2 is a vertical axial section on the line 2—2, Fig. 3;

Fig. 4 is a vertical section on the line 4—4, Fig. 3.

Figure 3:
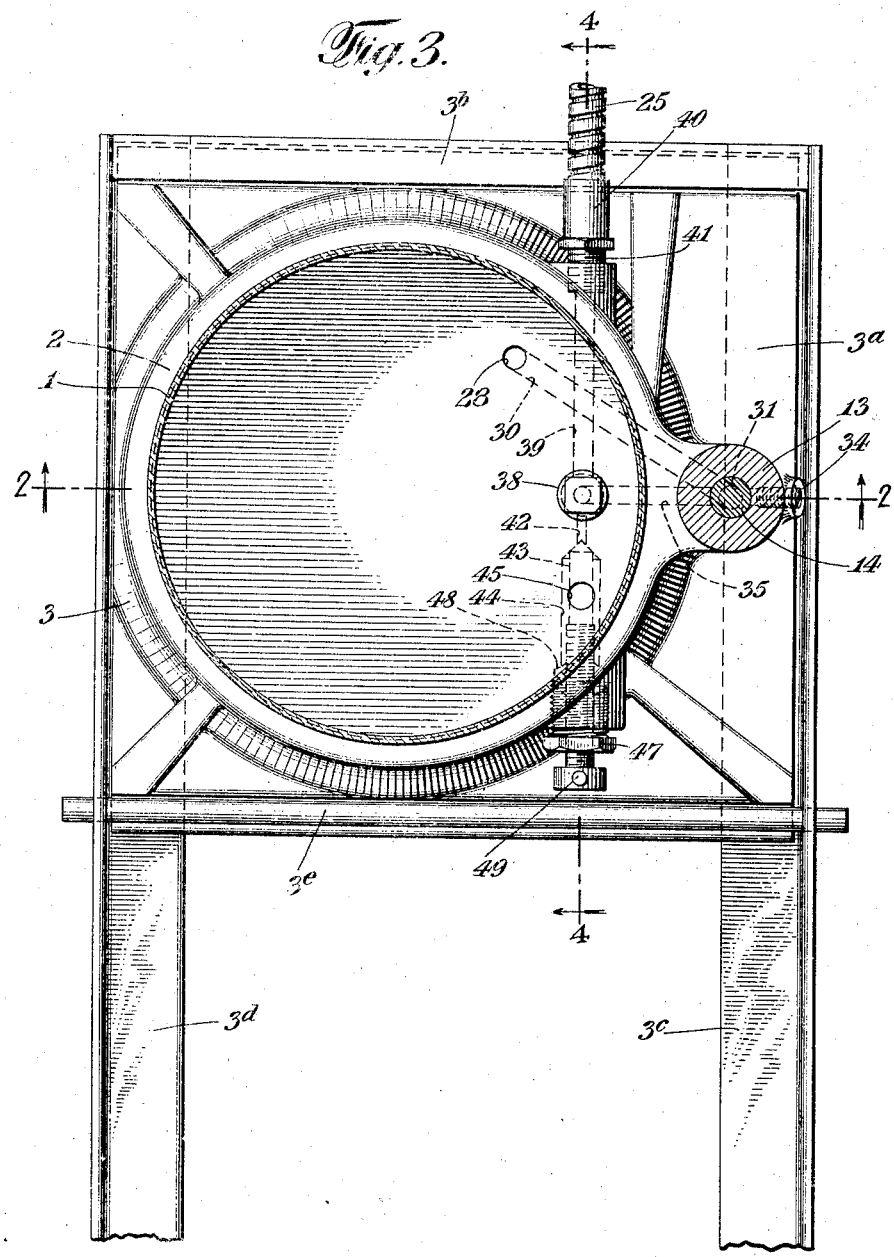
Fig. 3 is a horizontal section on the line 3—3, Fig. 2.

In these drawings, the grease reservoir is shown as comprising a cylinder 1 screw-threaded into an annulus or collar 2 integral with a suitable base 3. The cylinder 1 has a removable screw-threaded closure 4, in which is threaded a screw 5 having at the upper end an operating handle 6 and at the lower end a piston head 7 provided with suitable packing, preferably in the form of a cup leather 8 which, as shown more clearly in Fig. 2, naturally tends to trap air above the body of grease to be forced down thereby. The piston and cup leather are secured to the screw 5 in any suitable way, as by forming the latter with a shoulder 9, reduced shank 10 and a riveted head 11 on the lower end of the latter. The above elements constitute a desirable means for force feeding a reservoir supply of the grease to the interior of the pump, but other means may be employed, either hand operated or automatic, and the trapped air may be minimized or even eliminated as a feeding factor.

The base 3 carries, preferably integral therewith, the pump cylinder 13 in which slides pump plunger 14, preferably provided with cup leather 15 secured by screw 16. This plunger 14 is operated by a lever 18, which may have a removable extension handle 19. The lever is secured to the plunger 14 by pivot 20 and is fulcrumed on pivot 21 at the upper end of link 22 which is pivoted to the base at 23. Preferably, the base 3 carrying the above parts has a square flange portion 3$^a$, affording a base amply sufficient for stable support of the above parts until great stress is applied to the long handle 19 in operating the plunger 14. To take care of the latter condition, the square base 3$^a$ is removably fitted into an operating base comprising an angle iron 3$^b$, rigidly secured as by spot welding between two longitudinal angle irons 3$^c$ and 3$^d$, which extend parallel with each other and with the plane of the pump handle. The edge of the base 3$^a$ is held in engagement with the flanges of these angle irons by a removable locking rod 3$^e$.

The ducts and valves for control of passage of the grease from reservoir 1 through the pump cylinder and to the flexible metalic hose 25 terminating in the nozzle 26 for detachable application to the bearing or other duct to be lubricated, are preferably formed in the base 3. As will be evident from Figs. 2 and 3, the grease is forced from the reservoir 1 through outlet 28, through vertical passage 29 to the horizontal passage 30 and up passage 31 the outlet of which is controlled by ball check valve 32, displacement of the ball from the valve chamber being prevented by a wire or other projection 33 on the end of screw plug 34 which closes the outer end through which the pump outlet passage 35 was drilled.

The latter passage opens upwardly through a check valve the ball 36 of which is yieldingly held to its seat by spring 37 abutting against screw plug 38. The valve chamber opens through a horizontal passage 39 opening through the base, preferably in a direction opposite to the direction of the pump handle. As shown in Fig. 4, a metallic hose 25 of the type capable of withstanding enormous pressures is secured by sleeve 40 and nipple 41, over the exit end of said outlet pipe 39.

Extending from the chamber of valve 36, preferably in the opposite direction from the outlet 39, is a by-pass or vent 42 controlled by a conical valve 43 which may be opened to relieve pump pressure on the grease and permit back flow from the hose 25 through passage 39, chamber valve 36, passage 42, 44 and throughout outlet 45 back into the reservoir. It will be understood that the pressures applied by the pump are so enormously higher than the feed pressures applied through piston 7, that such relief flow is possible and desirable to prevent waste of grease when the coupling 26 is detached after use. Valve 36, of course, prevents back flow through the supply duct. The valve 43 is screw-threaded in a bushing 47, which serves to compress packing 48, and there is an exterior handle 49 by which said screw can be rotated to close the relief valve during pumping and to open it for relief after pumping.

In operation, the cap 4 is unscrewed and withdrawn with piston 7, cylinder 1 is filled with grease and the piston and cap replaced. Screwing down 5 by the handle 6 applies the pressure on grease. The relief valve 43 being closed and the coupling 26 applied to the "Alemite," "Dot" or other fittings of a duct to be lubricated, the grease flows under the pressure applied by the reservoir through the duct 29, 30 and by check valve 32 in position to be reached by down stroke of the plunger 14. The up stroke of the plunger applies suction, assisting the grease to fill the pump cylinder 13 and, on the down stroke, the check valve 32 seats automatically, and the plunger forces the grease to flow through valve 35 by check valve 36 and out through the hose 25. Valve 36 automatically closes on the suction stroke of the plunger.

It is evident that any grease gun mechanism capable of forcing grease through the passages 29, 30 and 31 and valve 32 into the pump chamber, may be used in place of the form shown in the drawings. Other changes and substitutions may be made without departing from the spirit of my invention.

By properly designing the area of the pump plunger and the length of the pump handle, any desired pressure may be applied through the outlet coupling 26, the practical limit being the bursting strength of commercially available hose, and for my purposes I find that pressures as high as 18,000 to 20,000 lbs. are available and, in many cases, may be highly desirable for forcing grease through inlet valves and ducts that have become obstructed by caked grease, rust or dirt.

Where very high pressures are thus available, any air or other elastic element in the grease being pumped will be put under enormous compression in the hose 25 and this pressure cannot be entirely removed by opening relief valve 43 because of the resistances of the passage and residual pressures in the reservoir 1 that prevent free back flow relief into said reservoir. Hence it may be desirable to have a valve 53 near the outlet end of the hose 25, to be closed after the relief valve 43 has been opened and before the coupling 26 is detached. This will prevent any expansion in the grease contained in the hose 25 from operating to waste the grease by forcing a greater or less amount of it through the outlet of the coupling after it has been detached.

Where the grease has been charged into the reservoir in melted condition and care has been taken to entirely exclude air, it may be possible to apply a practically rigid pressure on all the grease in the reservoir. For this or other reasons, it may be desirable to have the force feed maintained by continued mechanical pressure actively applied through the piston during the suction stroke of the pump, but this may be accomplished either by hand operation or by various mechanical devices causing the feed screw 5 to be rotated by and during the suction stroke of the pump. Where, for the above or any other reason, effective elastic range of back pressure afforded by the pumped grease and the hose through which it flows, are not too great, release of pressure either by unscrewing the reservoir piston or by a suction stroke, or partial suction stroke, of the pump may be sufficient to render the valve 53 unnecessary and in many cases, the relief valve 43 also.

I claim:

1. A grease gun, including a relatively large cylinder and piston adapted to hold a reservoir supply of grease and screw-operated means for forcing the piston to expel service charges of the grease through a suitable outlet conduit, in combination with a powerful small-capacity pump having a cylinder and piston receiving grease from the outlet of the grease gun through a check valve and adapted to expel small service charges at pressures much higher than the reservoir pressure, and means for releasing the high pressure applied to the service charge comprising a manually controlled relief valve independent of the pump piston and a conduit for by-passing grease back to the reservoir.

2. A grease gun, including a relatively large cylinder and piston adapted to hold a reservoir supply of grease and screw-operated means for forcing the piston to expel service charges of the grease through a suitable outlet conduit, in combination with a powerful small-capacity pump having a cylinder and piston receiving grease from the outlet of the grease gun through a check valve and adapted to expel small service charges at pressures much higher than the reservoir pressure, and means for releasing the high pressure applied to the service charge comprising a manually controlled relief valve independent of the pump piston and a conduit for by-passing grease back to the reservoir.

3. A grease gun, comprising a horizontal metal base, a vertical reservoir cylinder and piston mounted on said base and discharging through an outlet passage and check valve in said base and screw-operated means for forcing the piston to expel service charges of the grease through said check valve, in combination with a powerful service charge pump having a vertical cylinder and piston mounted on said base, receiving grease from said reservoir through said check valve and adapted to expel small service charges at pressures much higher than the reservoir pressure, and means for releasing the high pressure applied to the service charge comprising a manually controlled relief valve independent of the pump piston and a conduit for by-passing grease back to the reservoir.

4. In a grease gun, a relatively large supply cylinder, a small high pressure plunger pump, means for supplying grease from the cylinder to the pump, means for expelling service charges from the pump at very high pressures, and means for releasing the high pressure applied to the service charge back to the reservoir independently of the position of the pump plunger, comprising a manually operated relief valve and a conduit associated therewith.

5. In apparatus of the character set forth, the combination of a container for the material, means communicating with said container for placing the material under relatively high pressure, a conduit through which the material discharges from said means, and means, operative in any position of said first-named means, for relieving the pressure at the discharge end of said conduit by reducing the pressure of the material throughout the apparatus to that of the pressure of the material in said container.

6. In apparatus of the character set forth, the combination of a container for the material, means for placing the material in the container under pressure for forcing the material therefrom, means communicating with said container for placing the material, discharged therefrom, under relatively high pressure, a conduit through which the material discharges from said second-named means, and means, operative in any position of said second-named means, for relieving the pressure at the discharge end of said conduit by reducing the pressure of the material throughout the apparatus to that of the pressure of the material in said container.

7. In apparatus of the character set forth, the combination of a container for the material, means communicating with said container for placing the material under relatively high pressure, a conduit through which the material discharges from said means, and means, separate from said first-named means, for relieving the pressure at the discharge end of said conduit by reducing the pressure of the material throughout the apparatus to that of the pressure of the material in said container.

8. A grease gun including a cast base, a grease reservoir upstanding thereon, a plunger type pump including a cylinder fixed relatively to the base and a pump handle extending laterally beyond the base and arranged for movement in a generally vertical plane and means detachably connected to said base to hold it against tilting as the pump handle is forcibly depressed.

9. A grease gun including a cast base, a grease reservoir upstanding thereon, a plunger type pump including a cylinder fixed relatively to the base and a pump handle extending laterally beyond the base and arranged for movement in a generally vertical plane and means detachably connected to said base to hold it against tilting as the pump handle is forcibly depressed, said means including a detachable frame mounting the base near one end and having its other end extending in the general direction of the pump handle.

10. A grease gun including a cast base, a grease reservoir upstanding thereon, a plunger type pump including a cylinder fixed relatively to the base and a pump handle extending laterally beyond the base and arranged for movement in a generally vertical plane and means detachably connected to said base to hold it against tilting as the pump handle is forcibly depressed, said means including ground-engaging angle irons extending in the direction of the handle and spaced a sufficient distance apart to prevent tilting of the base in directions generally transverse of the axis of the angle irons.

Signed at New York, in the county of New York and State of New York, this 5th day of August, A. D. 1925.

CHARLES L. ZABRISKIE.